UNITED STATES PATENT OFFICE.

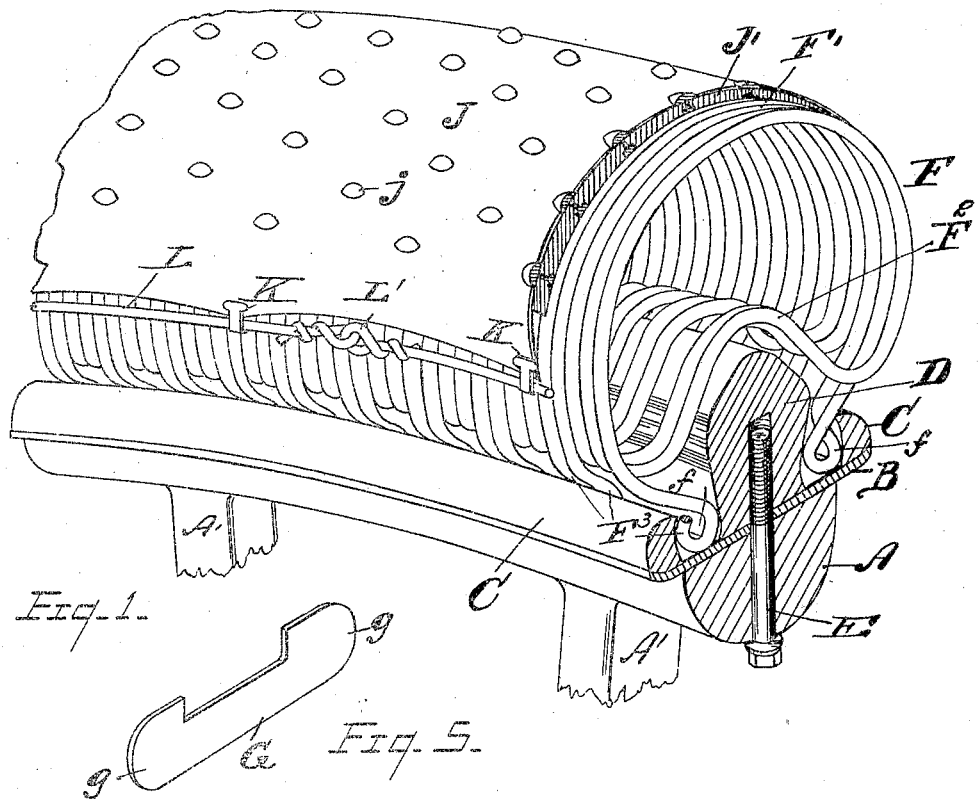
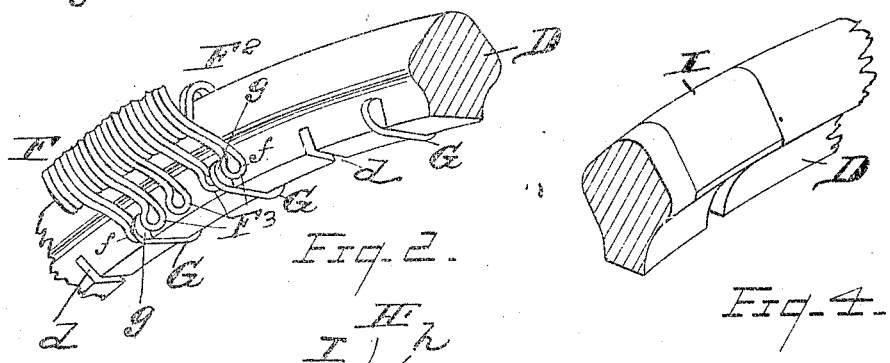
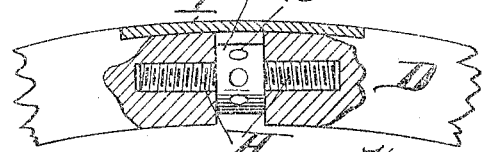

HUGH A. CARMICHAEL, OF WEST LORNE, ONTARIO, CANADA.

RESILIENT TIRE FOR VEHICLES.

1,039,897.  Specification of Letters Patent.  Patented Oct. 1, 1912.

Application filed February 1, 1911. Serial No. 605,877.

*To all whom it may concern:*

Be it known that I, HUGH A. CARMICHAEL, a subject of the King of Great Britain, residing at West Lorne, county of Elgin, Province of Ontario, Dominion of Canada, have invented a certain new and useful Improvement in Resilient Tires for Vehicles, and declare the following to be a full, clear, and exact description of the same, such as will enable others skilled in the art to which it pertains to make and use the same, reference being had to the accompanying drawings, which form a part of this specification.

My invention relates to an improvement in resilient tires for vehicles, shown in the accompanying drawings and more particularly pointed out in the following specification and claims.

The object of my invention is to provide a resilient tire the efficiency of which will not be destroyed by a puncture as in the case of a pneumatic tire.

Other advantages and improvements will hereafter appear.

In the drawings accompanying this specification:—Figure 1 is a fragmentary perspective view of a wheel and a portion of the resilient tire mounted thereon. Fig. 2 is a fragmentary perspective view of the annular ring dividing the rim of the wheel and the means employed in connection therewith to prevent the resilient tire from creeping. Fig. 3 is a detail view in section showing the means employed to connect the sections of the annular ring together. Fig. 4 is a fragmentary perspective view showing adjacent ends of the annular ring and the plate bridging the space between the intersections. Fig. 5 is a perspective view of one of the cross plates carried by the annular ring to secure the resilient tire against "creeping".

Referring now to the letters of reference placed upon the drawings: A indicates the felly of a wheel, and A′ its spokes.

B is a metallic rim surrounding the felly, and C, C, are removable flange rings carried thereon.

D is an annular ring which may be formed of a plurality of sections, mounted in the middle of the rim B and hereafter referred to as the "bridge ring".

E indicates one of the bolts securing the bridge ring to the rim and felly. These bolts E have threaded connection with the bridge ring D, as clearly shown in Fig. 1 and are adapted to prevent lateral movement of the bridge ring, the rim and the felly of the wheel with relation to one another.

F is a tire preferably formed of a continuous coil of wire, its periphery F′, being substantially semi-circular in cross-section while certain portions of the coils $F^2$ adjacent to the rim are given a V-shaped formation spanning the bridge ring D; these in turn alternate with portions bent outwardly forming relatively small loops $f$ which collectively serve as a bead $F^3$, engaged by the flanges C and the bridge ring D.

G denotes cross plates respectively lodged in the slots $d$ of the bridge ring;—the ends $g$ of the cross plates extending laterally from the wall of the bridge ring between the loops $f$ of the tire F, to prevent the "creeping" of the tire on the rim.

H is a right and left threaded bolt respectively engaging the opposing ends of the bridge ring,—the bolt is provided with a central head H′ integral therewith, having recesses $h$ to receive a pin or other suitable tool by which it may be actuated.

I is a bridge plate set in the recesses formed in the top of the bridge ring to close the space between the opposing sections.

J is a tread or shoe inclosing the tire F and which may be formed of leather or other suitable material, to which is secured a lining J′ of felt.

K indicate hooks or other suitable securing devices engaging the wire rings L placed on each side of the tire,—the ends of the rings L being in turn joined together by the loops L′ or other means for securing the same.

The tread or shoe J may be studded with rivets $j$ by which the cover and its lining are secured together,—the projecting ends of the rivets providing means to secure the tire against skidding.

Having indicated the several parts by reference letters, it will be seen that the peculiar shape given to the coil forming the tire will afford great resiliency while its V-shaped portion spanning the bridge ring secures the tire from being torn off through any great lateral strain due to the vehicle turning suddenly while traveling at a high rate of speed. The arms of the V-shaped portion bearing against the walls of the bridge ring offer great resistance to the wrenching tendency occasioned through operating under these conditions.

By alternating the V-shaped portion of the coil spanning the bridge ring with loops bent to form collectively a bead lodged between the ring and the flanges of the rim, means are provided to securely lock the tire to the rim while the cross plates G, carried by the bridge ring, serve to secure the tire against "creeping" on the rim, as will be readily understood.

It will be seen that when operating under an excessive load or when traveling over stones or deep ruts, the tendency to break is relieved by the V-shaped portion bearing upon the bridge ring which action results in relieving the bending strain of the coil, particularly of that portion adjacent to the rims, the result being a gradual flattening of the tire which afterward springs back to its original form.

Having thus described my invention, what I claim is:—

1. In a resilient tire for vehicles, a coil of wire having an annular form to encircle the rim of a wheel, certain of the coils being looped outwardly adjacent to the rim of the wheel to collectively form securing edges on opposite sides of the tire, a bridge ring secured to the rim of the wheel and adapted to coöperate with said coil of wire to prevent lateral deflection of the coil of wire, said ring having a plurality of slots in its inner surface, and plates secured in said slots of the ring and adapted to project between the outwardly looped edges of said certain coils to prevent creeping of the coil of wire.

2. In a resilient tire for vehicles, a coil of wire formed annularly to encircle the rim of a wheel, certain of the coils being bent inwardly to form an internal annular depression, said bent coils alternating with a plurality of others looped at the side of the tire thereof to collectively form securing edges on opposite sides of the tire whereby the tire may be secured to the wheel, and an annular bridge ring secured to the rim of the wheel and adapted to project into said depression formed in the tire and normally out of contact with said depression, the sides of said depression being adapted to contact with said bridge ring on lateral strain placed on the tire whereby the tire is secured against lateral dislodgment or strain.

3. In a resilient tire for vehicles, a coil of wire formed annularly to encircle the rim of a wheel, certain of the coils being bent inwardly to form a substantially V-shaped internal annular depression, said bent coils alternating with a plurality of others looped outwardly at the side of the tire to collectively form securing edges on opposite sides of the tire whereby the tire may be secured to the wheel, and an annular bridge ring secured to the rim of the wheel and adapted to project into said V-shaped depression formed in the tire and normally out of contact with said depression, the sides of said lateral depression being adapted to contact with said ring on lateral strain placed on the tire whereby the tire is secured against lateral dislodgment or strain, a cover tread embracing the outer surface of the tire, and means to secure the cover to the tire.

4. In a resilient tire for vehicle wheels, a coil of wire formed annularly to encircle the rim of the wheel, the ends of the wire and certain of the coils being looped outwardly to form securing edges on opposite sides of the tire, other coils being deflected inwardly to provide an annular substantially V-shaped depression, and an annular bridge ring secured to the rim of the wheel and adapted to project into the V-shaped depression and being normally spaced from the depression, the V-shaped depression of the tire being adapted to contact with said bridge ring to prevent lateral strain on the tire.

5. In a resilient tire for vehicles, a coil of wire having an annular form to encircle the rim of a wheel, certain of the coils being bent inwardly in substantially a V-shaped form, said coils alternating with others looped outwardly adjacent to the rim of the wheel to collectively form beads on each side of the tire, a bridge ring adapted to be secured to the rim of the wheel and to project into the V-shaped depression formed in the tire, said bridge ring slotted to receive a plurality of laterally projecting plates, and the plates adapted to project between the looped portions of the coils whereby the tire is secured from creeping.

6. A resilient tire for vehicle wheels, comprising a coil of wire formed annularly with certain of the coils directed inwardly to form a substantially V-shaped depression, the other coils being looped outwardly to form securing edges on the opposite sides of the wheel, the loops of the looped coils being arranged at the side of the tire opposite the tread surface thereof with the depression between the tread surface and said looped coils.

7. In a resilient tire for vehicle wheels, the combination with a wheel provided with a rim and having spaced clencher rings, of an annular bridge ring secured to the rim between said clencher rings, a coil of wire formed annularly to encircle the rim of the wheel, certain of the coils being bent inwardly to form an annular depression to receive said bridge ring, the latter being normally spaced from the depression, said inwardly directed coils alternating with a plurality of other coils looped outwardly to form annular spring securing edges on opposite sides of the tire adapted to fit between the sides of said bridge ring and the inner faces of the corresponding clencher rings whereby the coil of wire is secured to the rim, said bridge ring being adapted to be engaged by said depression upon lateral strain on the tire to prevent dislodgment of the tire incident to lateral strain, and means connected to the bridge ring and coöperating with the coils which are looped outwardly to prevent creeping of the tire.

8. In a resilient tire for vehicle wheels, the combination with a wheel provided with a rim and clencher rings on opposite sides of the rim, of an annular bridge ring secured to the rim between the clencher rings, and a coil of wire formed annularly to encircle the rim of the wheel, certain of the coils being bent to collectively provide securing edges on opposite sides of the tire and adapted to fit between said bridge ring and the clencher rings whereby the tire is secured to the rim against displacement, and plates secured to the inner surface of the annular ring and projecting between those coils which are bent as aforesaid to prevent creeping of the tire on the rim.

In testimony whereof, I sign this specification in the presence of two witnesses.

HUGH A. CARMICHAEL.

Witnesses:
GRACE E. WYNKOOP,
SAMUEL E. THOMAS.